United States Patent
Farris

(10) Patent No.: US 9,689,498 B2
(45) Date of Patent: Jun. 27, 2017

(54) FLUSH VALVE

(71) Applicant: Bobby Wayne Farris, Hattiesburg, MS (US)

(72) Inventor: Bobby Wayne Farris, Hattiesburg, MS (US)

( * ) Notice: Subject to any disclaimer, the term of this patent is extended or adjusted under 35 U.S.C. 154(b) by 0 days.

(21) Appl. No.: 14/931,841

(22) Filed: Nov. 3, 2015

(65) Prior Publication Data

US 2017/0037972 A1 Feb. 9, 2017

Related U.S. Application Data

(60) Provisional application No. 62/201,557, filed on Aug. 5, 2015.

(51) Int. Cl.
*F16K 1/12* (2006.01)
*F25B 41/04* (2006.01)
*F16L 55/11* (2006.01)

(52) U.S. Cl.
CPC ............... *F16K 1/12* (2013.01); *F16L 55/11* (2013.01); *F25B 41/04* (2013.01); *F25B 2400/162* (2013.01)

(58) Field of Classification Search
CPC ..... F16K 1/00; F16K 1/12; F16K 1/32; F16K 1/34; F16K 1/36; F16K 1/42; F16K 1/422; F16K 3/00; F16K 3/22; F16K 3/30; F16K 27/002; F16K 31/44; F16K 31/60; F25B 41/04; F25B 2400/162
USPC .......... 137/237, 238; 251/77, 118, 122, 213, 251/282, 284, 63.4, 318, 326, 329; 4/256.1
See application file for complete search history.

(56) References Cited

U.S. PATENT DOCUMENTS

| | | | | |
|---|---|---|---|---|
| 3,128,078 A | * | 4/1964 | Kosik | F16K 3/0263 251/214 |
| 3,394,735 A | * | 7/1968 | Wurster | B01D 35/12 137/625.32 |
| 4,270,727 A | | 6/1981 | Norman | |
| 5,379,982 A | * | 1/1995 | Koyomogi | F16K 1/10 137/375 |
| 5,472,015 A | * | 12/1995 | Chiou | F16K 1/10 137/556 |
| 9,097,390 B1 | * | 8/2015 | Ward | F17D 1/08 |
| 2011/0030132 A1 | * | 2/2011 | Biro | E03C 1/298 4/256.1 |

* cited by examiner

*Primary Examiner* — William McCalister
*Assistant Examiner* — Ian Paquette
(74) *Attorney, Agent, or Firm* — William C. West

(57) ABSTRACT

A Flush Valve is provided that comprises a plug valve located between a first cleanout and a second cleanout. The plug valve further comprises a plug assembly inserted in a pipe fitting. The Flush Valve may be placed in a drain line of a HVAC system resulting in a first section line and a second section line. A force is applied to a knob of the plug valve closing the plug valve, and a cleanout cap removed from each of the first cleanout and the second cleanout, and suction or a pressure applied to dislodge any debris in the first section line connected to the first cleanout and the second section line connected to the second cleanout. The cleanout caps may then be replaced and the force removed decompressing a spring in the plug valve and opening the plug valve allowing the HVAC system to drain.

2 Claims, 16 Drawing Sheets

FLUSH VALVE

CROSS-REFERENCE TO RELATED APPLICATIONS

This application claims the benefit of U.S. Provisional Application No. 62/201,557, Flush Valve, filed Aug. 5, 2015.

FEDERALLY SPONSORED RESEARCH

Not applicable.

BACKGROUND

Field of Invention

This invention pertains to valves used in to restrict the flow of liquid in a line. More particularly, this invention is a flush valve comprising a plug valve, a first cleanout and a second cleanout to be used when flushing a Heating Ventilation and Air Conditioning (HVAC) line.

Prior Art spring loaded plug valves are often designed to seal off the flow between two sections of pipe. These spring loaded plug valves can be operated by hand or a pressurized fluid and the spring loaded plug valves provide for a positive seat that prevents any leakage. Unlike the present invention, these spring loaded plug valves may be left in the closed position when used in the drain lines of an HVAC system. When these spring loaded plug valves are left is a closed position, water can backup in the HVAC drain line and eventually flood a structure in which the HVAC system is installed. Additionally, cleanouts are not provided to flush an HVAC system.

The Flush Valve of the present invention has a plug assembly that immediately opens a plug valve when sufficient pressure to keep the plug valve in a closed is removed. This prevents the present invention from being left is a closed state once drain lines are flushed, resulting in water from the HVAC system backing up and flooding a structure. Additionally, a middle leg of a standard pipe fitting, such as a tee pipe fitting, can be drilled out and the plug assembly inserted, transforming the standard pipe fitting into a new plug valve. A first and a second cleanout each can be made by using the tee pipe fitting with a cap installed on the middle leg of the fitting. The new plug valve is positioned between the first cleanout and the second cleanout to form the Flush Valve.

Valves used in conventional HVAC systems have an objective to control a flow of a liquid or a gas. In such conventional systems, some leakage of the liquid or gas can usually be tolerated. The present invention is intended for use on heating, ventilation, and air conditioning drain systems to allow the systems to be flushed. A small amount of leakage can be tolerated and a positive sealing action preventing all flow is not required of the present invention when the valve is closed. The present invention is a Flush Valve comprising a plug valve located between a first cleanout and a second cleanout. The Flush Valve is designed to be placed in a drain line of and HVAC system. This will allow a first section of the drain line between the HVAC system and the valve, and a second section of the drain line located between valve and an exit of the drain line to purge each section of the drain line.

The present invention is a plug valve having a plug assembly inserted in a middle opening of a middle portion of a pipe fitting. The plug valve is closed by applying a force to a plug stem connected to a plug so that the force moves the plug against an interior surface of a base portion, such as a base interior wall of the pipe fitting, closing off flow in the base portion between a first opening and a second opening. The first cleanout may be connected to the first opening and the second cleanout may be connected to the second opening of the plug valve. To open the plug valve, the force on the plug stem is removed, and a spring decompresses causing the plug to move away from the base interior wall of the base portion, opening up the flow between the first opening and the second opening of the base portion of the pipe fitting. With the flush valve closed, the first cleanout can be opened and a pressure or a suction force applied to the opened first cleanout to dislodge any debris in the drain line between the HVAC system and the plug valve. The second cleanout can be opened and the pressure or suction applied to the second opened cleanout to dislodge any debris in the drain line between the plug valve and the exit of the drain line.

DESCRIPTION OF THE DRAWINGS

The accompanying drawings, which are incorporated in and form part of the specification, illustrate various examples of the present invention and, together with the detailed description, serve to explain the principles of the invention.

DETAILED DESCRIPTION OF PREFERRED EMBODIMENTS

Figure 1A:
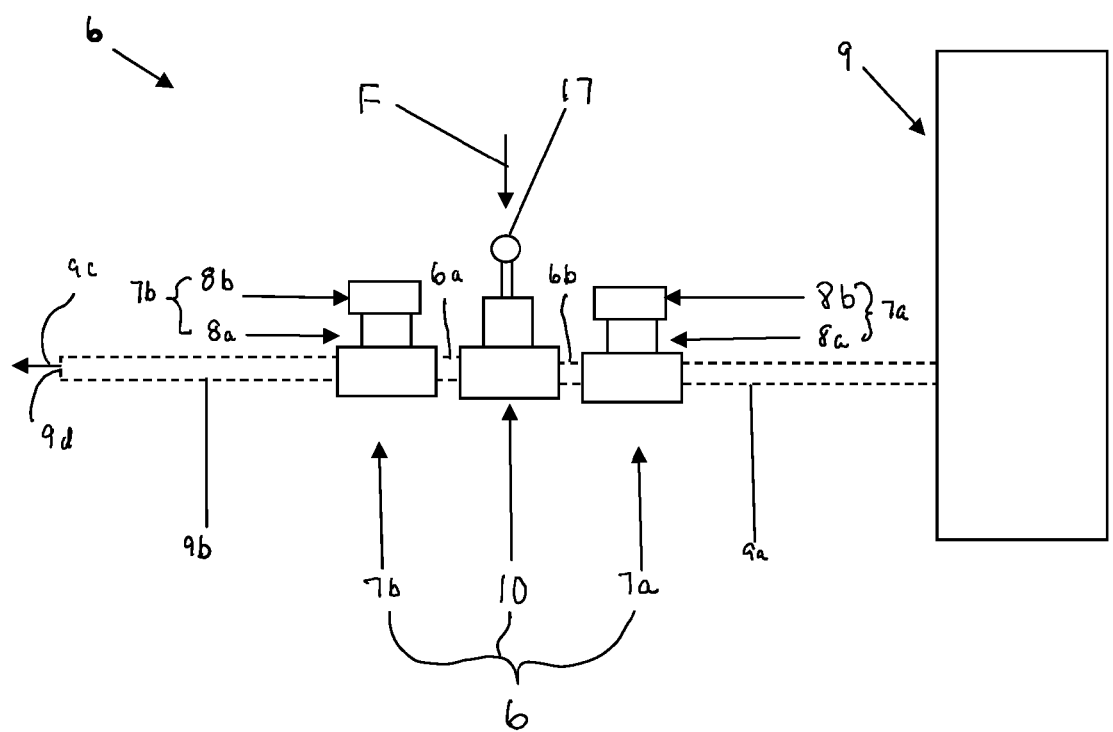
FIG. 1A shows a side view of a flush valve in an HVAC system

Looking at FIG. 1A, a preferred version of the present invention, a Flush Valve 6 is shown. The Flush Valve 6 may comprise a first cleanout 7a, a second cleanout 7b, and a plug valve 10 with the plug valve 10 located between a first cleanout 7a and a second cleanout 7b.

The first cleanout 7a may be connected to the plug valve 10 by using first connect pipe 6a and the second cleanout 7b may be connected to the plug valve 10 by using a second connect pipe 6a. The Flush Valve 6 may be placed between a first section line 9a and a second section line 9b in and HVAC system 9.

Figure 1B:
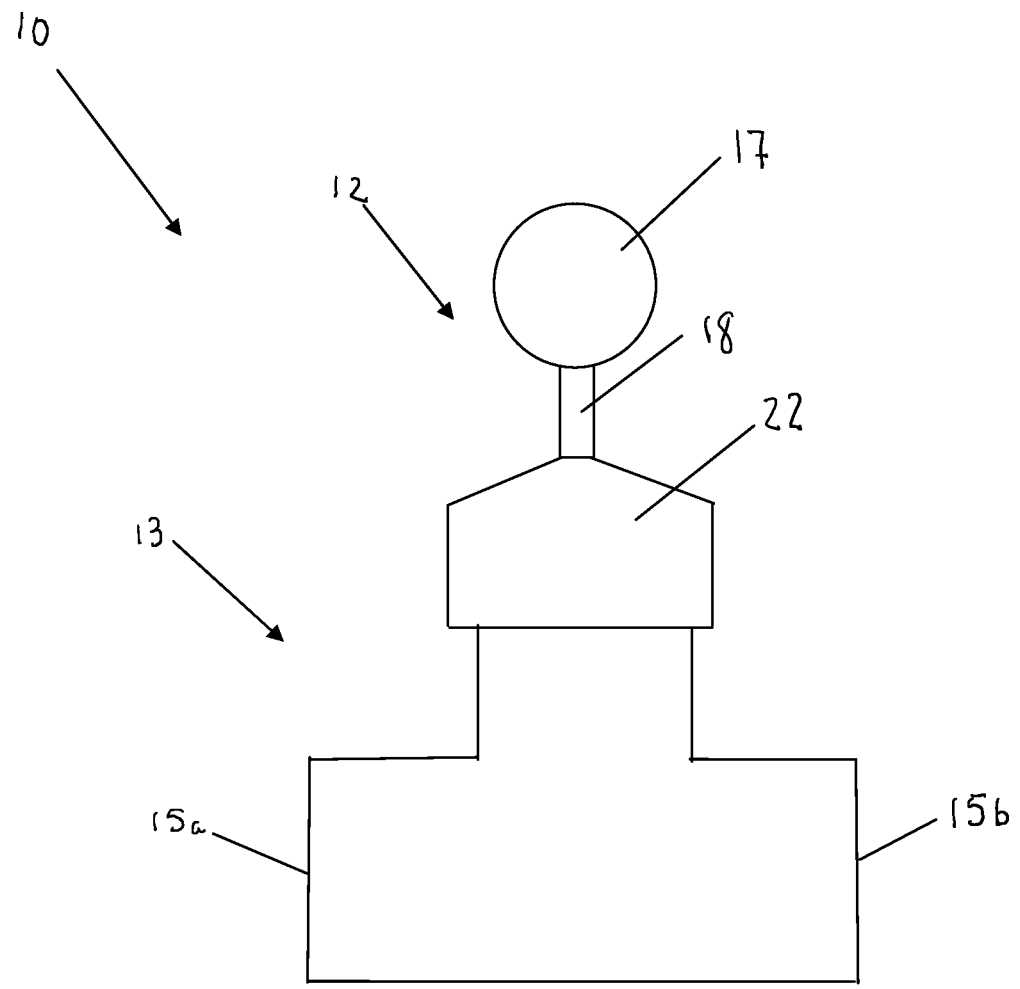
FIG. 1B is an elevation view of a plug valve
Figure 2A:
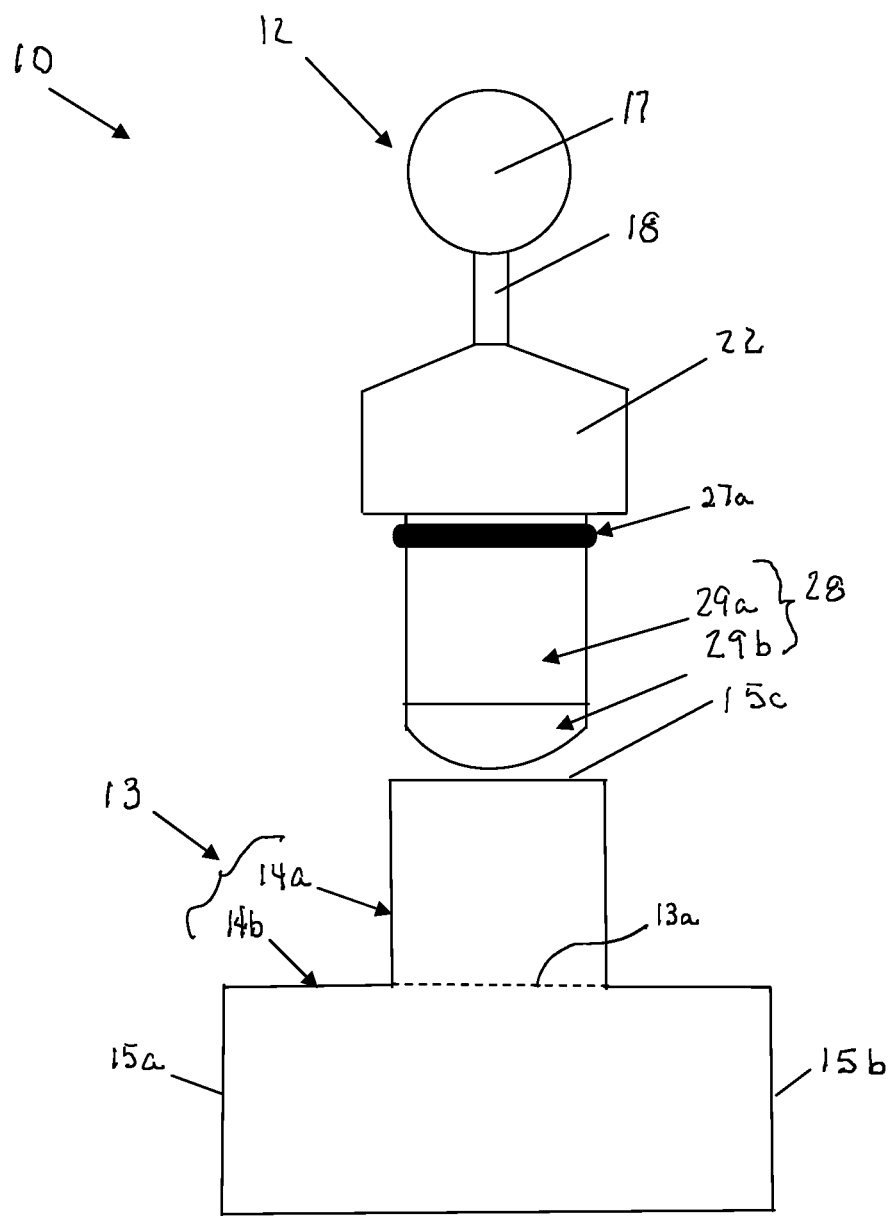
FIG. 2A is an elevation view of a plug valve assembly and a pipe fitting
Figure 2B:
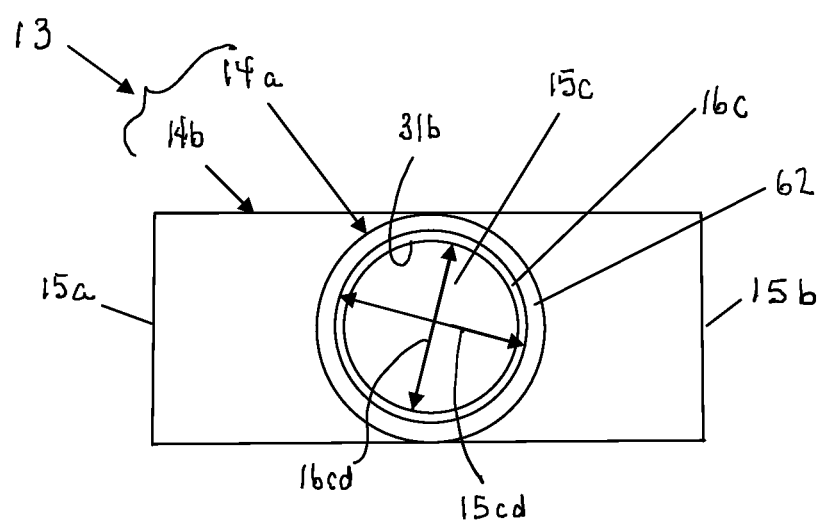
FIG. 2B is a plan view of a middle opening of the pipe fitting
Figure 2C:
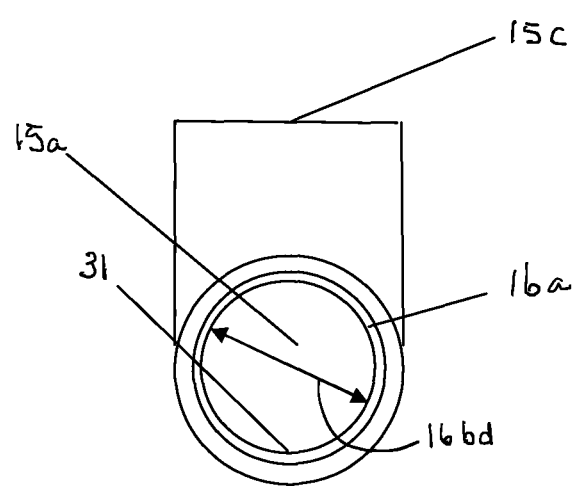
FIG. 2C is an elevation view of a first opening of the pipe fitting
Figure 2D:
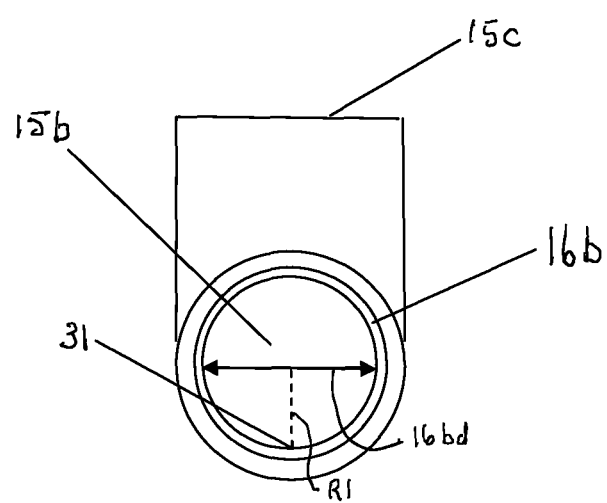
FIG. 2D is an elevation view of a second opening of the pipe fitting

Looking to FIG. 1B, the plug valve 10 comprises a plug assembly 12 and a pipe fitting 13. Looking to FIG. 2A, a side view of the pipe fitting 13, the pipe fitting 13 has a middle portion 14a (i.e., the middle leg) and a base portion 14b. The base portion 14b has at least a first opening 15a and a second opening 15b, and the middle portion 14a has a middle opening 15c with a middle opening diameter 15cd as shown in FIG. 2B, and the middle portion 14a runs from the middle opening 15c to the base portion 14b as shown by a fitting dashed line 13a in FIG. 2A. Looking again to FIGS. 1A and 2A, the plug assembly 12 is ideally adaptable to the pipe fitting 13. Looking at FIG. 2B, a top view of the middle opening 15c of the middle portion 14a of the pipe fitting 13, and also looking at FIGS. 2B, 2C and 2D, the middle opening 15c, the first opening 15a, and the second opening 15b have a middle inner rim 16c, a first inner rim 16a, and second inner rim 16b, respectively. The middle inner rim 16c, the first inner rim 16a, and the second inner rim 16b have a middle inner rim diameter 16cd, a first inner rim diameter 16ad, second inner rim diameter 16bd, respectively. Referring to FIG. 2C, the inner rims, such as the first inner rim 16a, prevent a joining pipe from being inserted to far in the openings, such as the first opening 15a, beyond the first inner rim 16a.

Figure 2E:
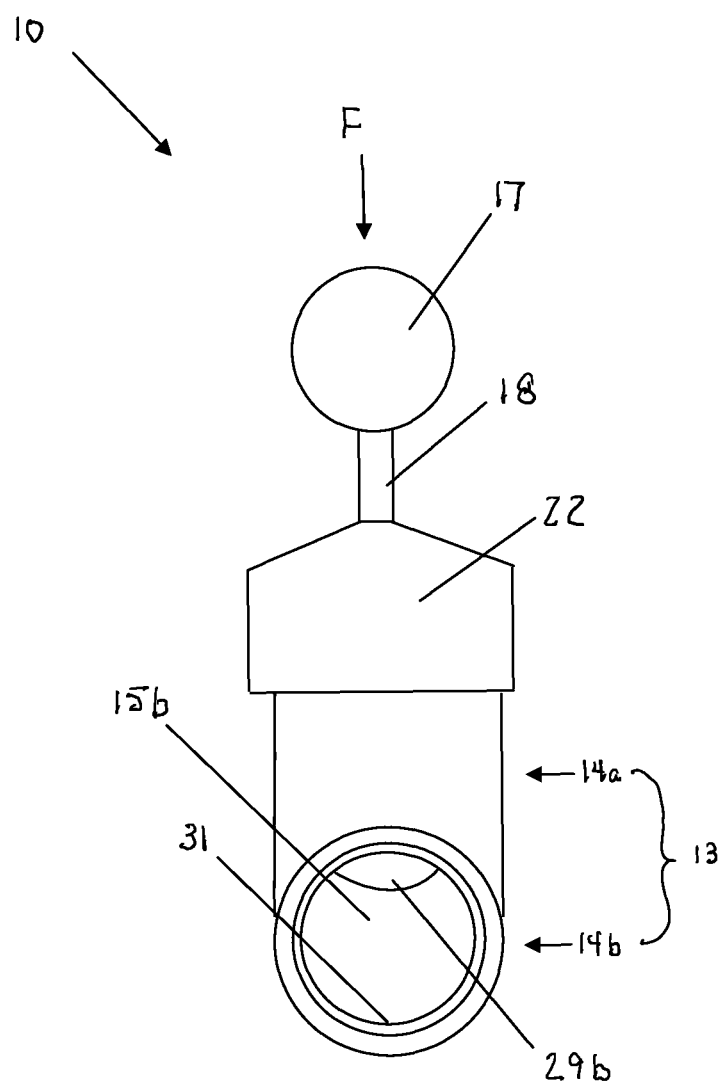
FIG. 2E is an end view of the second opening of the plug valve open
Figure 3:
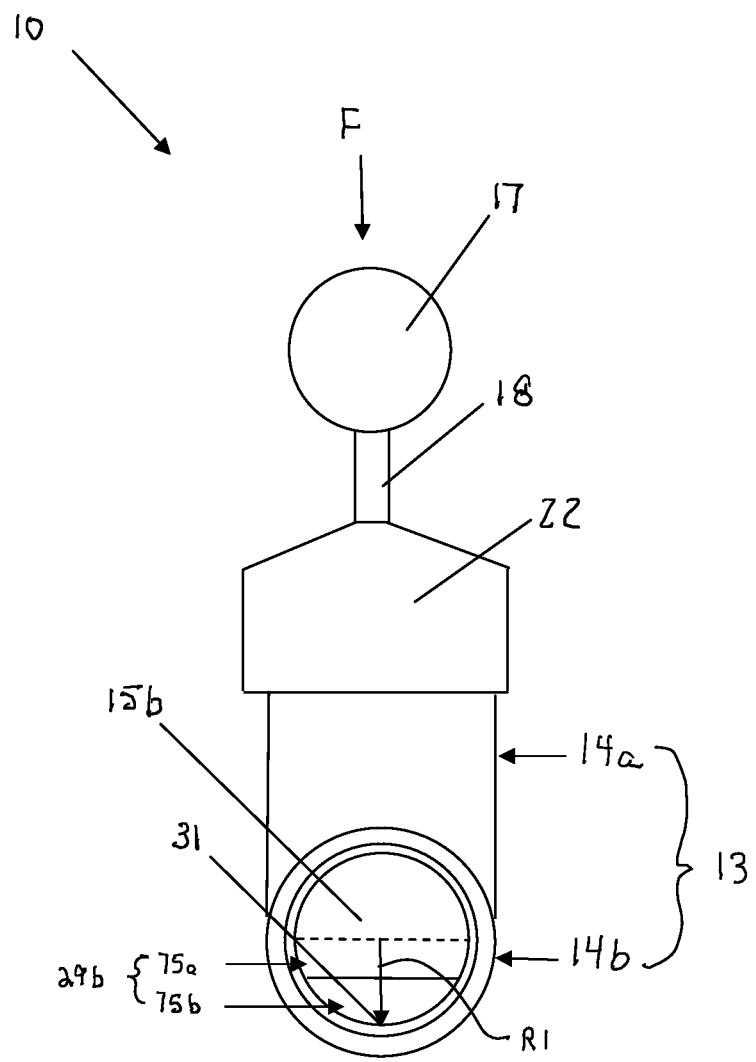
FIG. 3 is an end view of the second opening of the plug valve closed

Looking at FIG. 2E, an elevation view of the plug valve 10 from the second opening 15b, the plug valve 10 is closed by applying a force F to a knob 17 attached to a plug stem 18 and advancing the plug stem 18 through a cap 22 and forcing a plug seal portion 29b into a sealing relationship with a base interior wall 31 of the base portion 14b as shown in FIG. 3, closing the flow through the second opening 15b.

Figure 4:
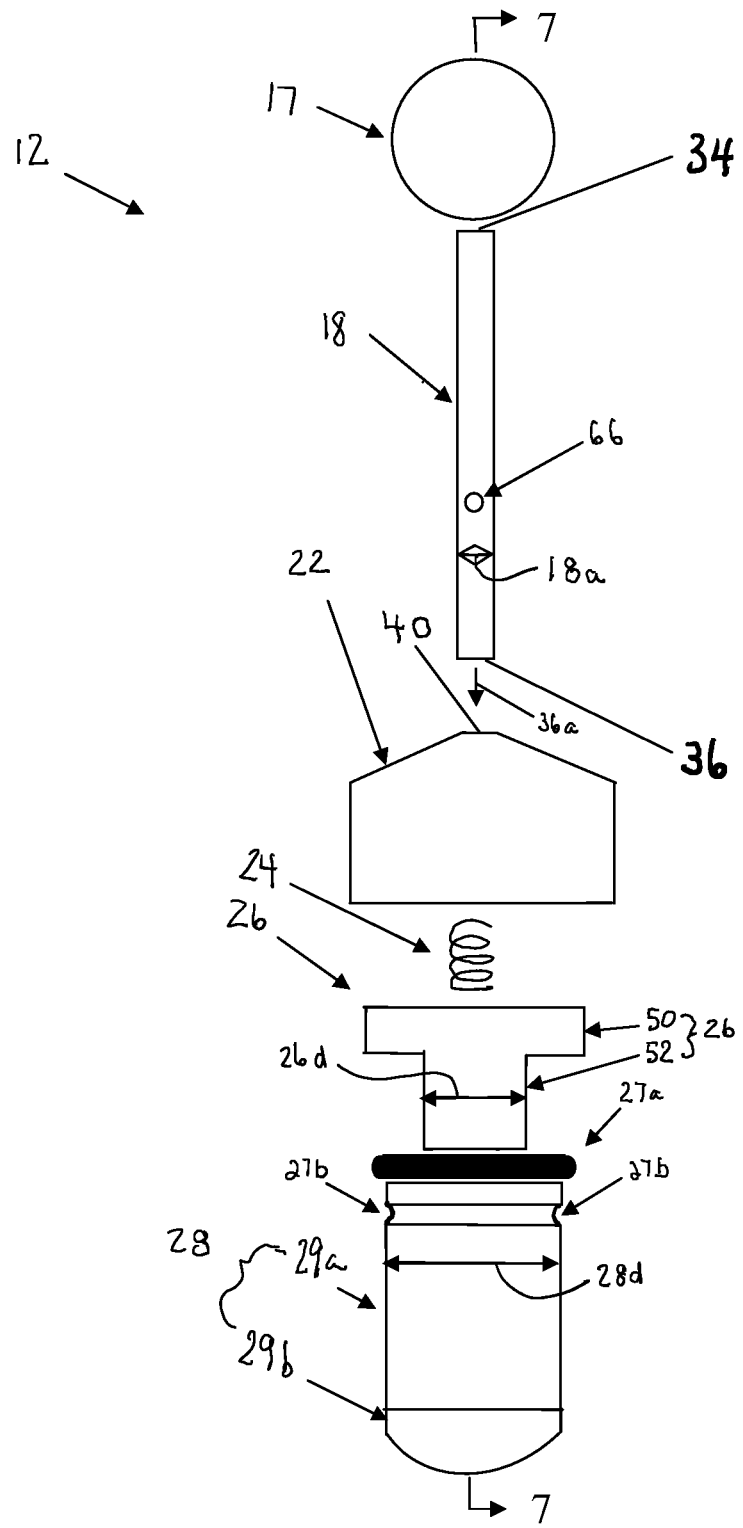
FIG. 4 shows an elevation view of the plug assembly components
Figures 5A, 5B:
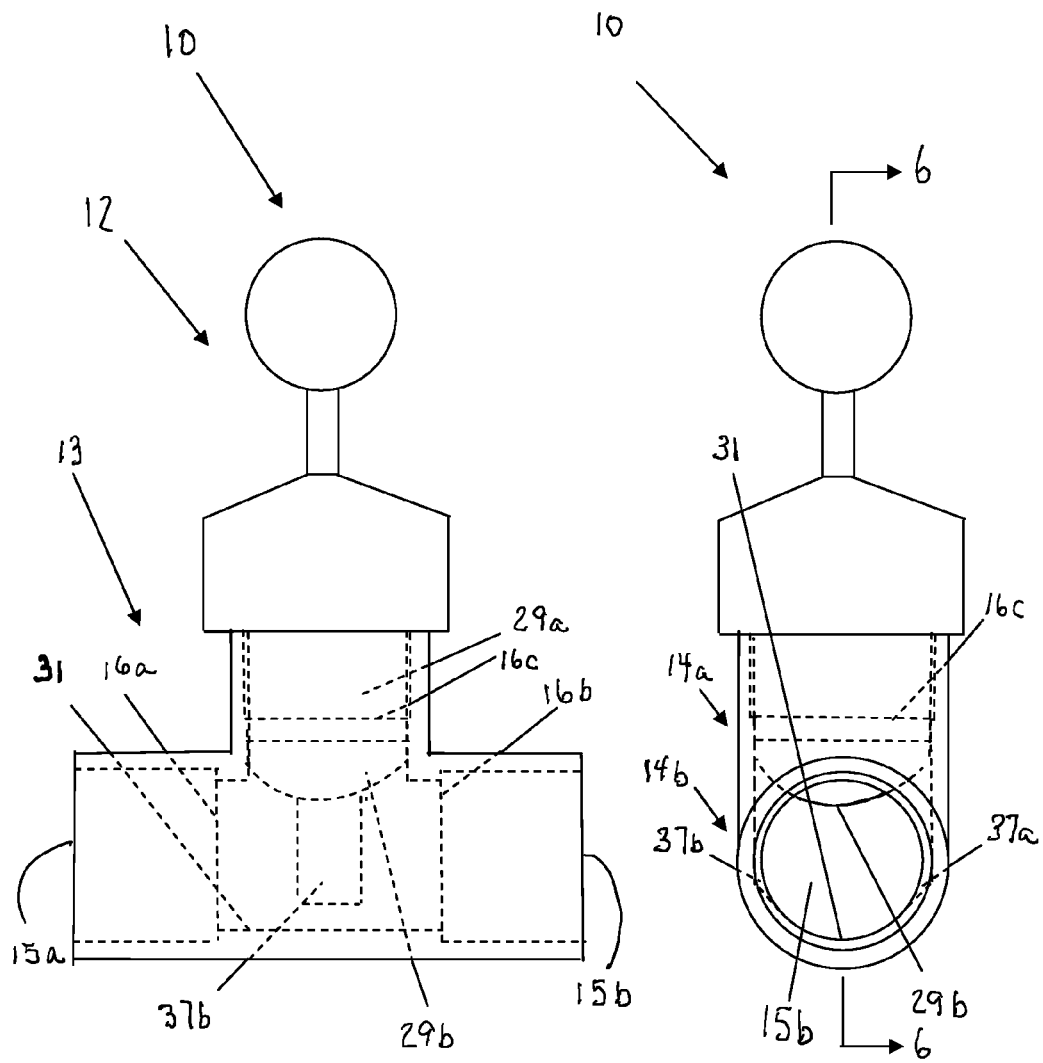
FIG. 5A shows a side elevation view of the plug valve
FIG. 5B shows another second end view of the plug valve with the plug seal portion retracted opening flow

Looking at FIG. 4, a view of the plug assembly 12 disassembled, the plug assembly 12 comprises a knob 17, a plug stem 18, a cap 22, a spring 24, a spring retainer 26, an upper seal 27a running circumferentially around the upper portion in an upper groove 27b, and a plug 28 having a plug first portion 29a and a plug seal portion 29b. Looking at FIG. 2B, and when the plug assembly 12 is adapted to the pipe fitting 13, the middle inner rim 16c of the middle portion 14a shown in FIG. 2C must be cut away to allow the plug seal portion 29b to move into the base portion 14b as shown in FIG. 5A. Looking at FIG. 5B, a first slot 37a and a second slot 37b may be cut from the middle inner rim 16c of the middle portion 14a down into the base portion 14b to allow the seal portion to contact the base interior wall 31.

Figure 6:
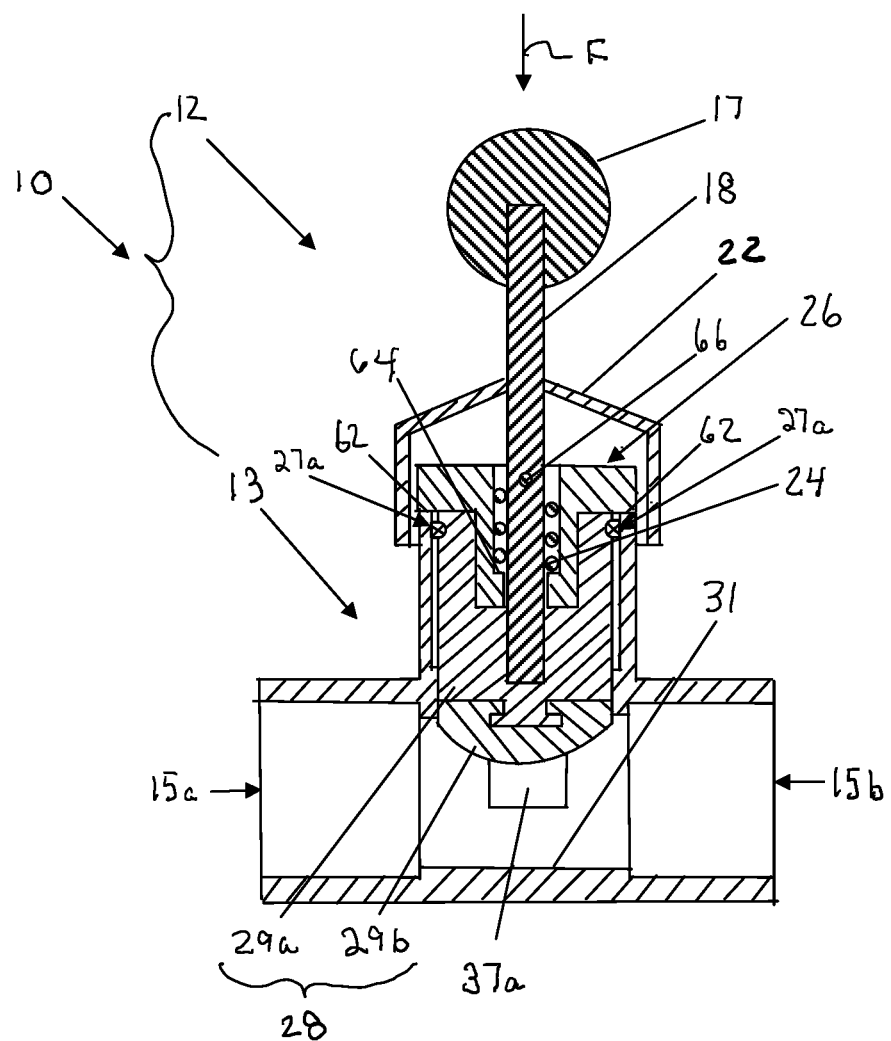
FIG. 6 shows a sectional view of the plug valve taken along line 6-6 in FIG. 5B
Figure 7:
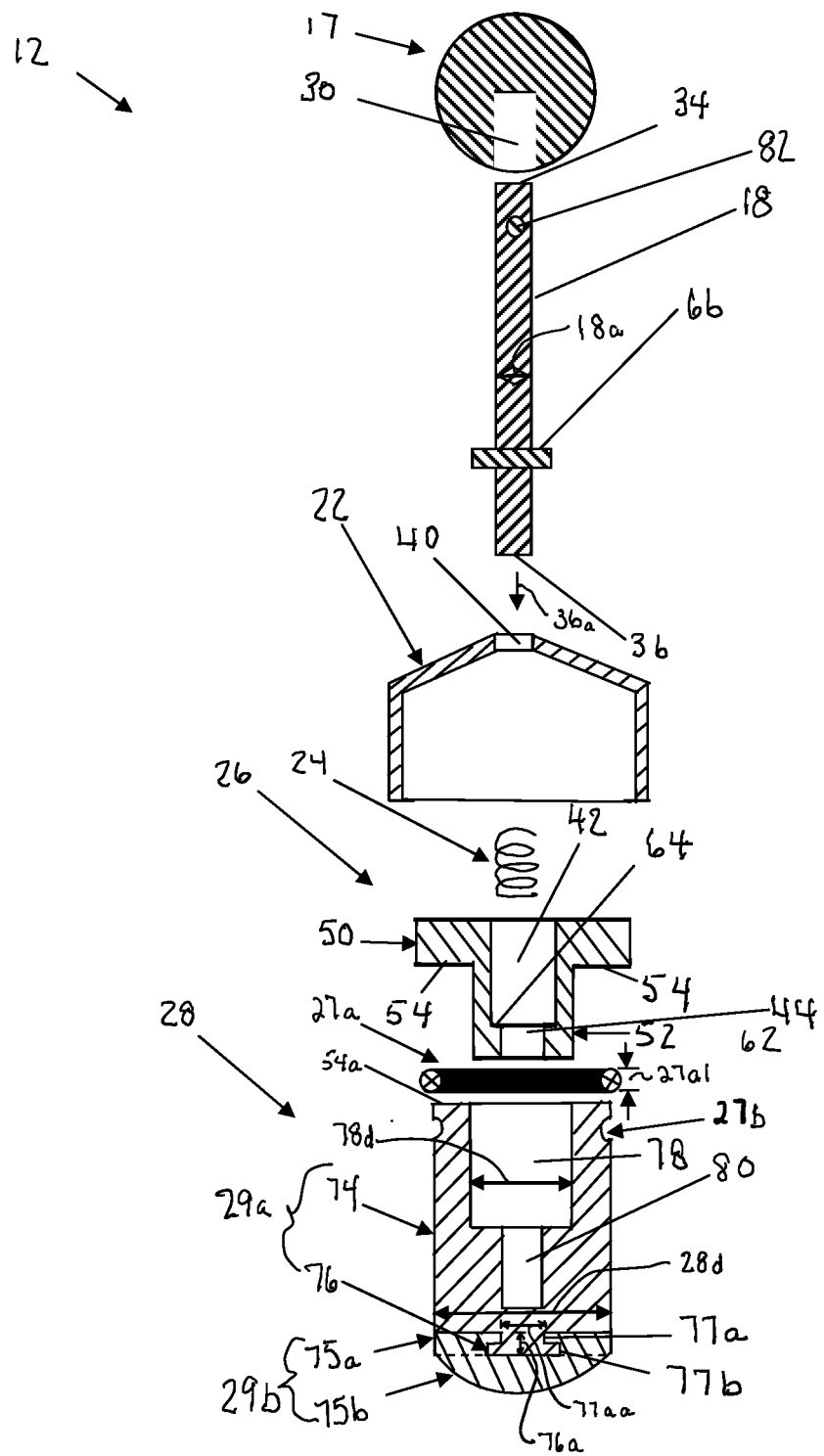
FIG. 7 shows a view of the plug valve assembly along line 7-7 of FIG. 4

Looking at FIG. 6, a sectional view of FIG. 5B, and looking at FIG. 7, a component view of the plug assembly 12 shown in FIG. 6, the knob 17 has a knob cavity 30 and the plug stem 18 has a stem first end 34 and a stem second end 36. The stem first end 34 is inserted in the knob cavity 30 and held in place by a stem fastening means 82. The stem fastening means 82 may be an adhesive, a pin, or a press fit, preferably an adhesive such as glue. The upper seal 27a generally has a seal diameter 27a1 that is generally between 0.1 to 0.25 inches in an upper groove 27b. The upper seal 27a1 may be an O-ring. The upper groove 27b located 0.25 to 0.5 inches below the plug top edge 54a. The cap 22 is sized to fit over the middle opening 15c of the pipe fitting 13 in FIG. 2A, and the stem second end 36 is inserted through a cap aperture 40 shown in FIG. 7, the cap aperture 40 is some sized somewhat larger that the a plug stem diameter 18a of the plug stem 18. Removing the spring pin 66, the stem second end 36 is further inserted through the spring 24 that is positioned in a retainer spring cavity 42 of the spring retainer 26. The spring retainer 26 also has retainer stem aperture 44 that is somewhat larger than a plug stem diameter 18a and allows the plug stem 18 to slide through the retainer stem aperture 44. The retainer spring cavity 42 is somewhat larger than the plug stem 18 and sized to hold the spring 24 when the spring 24 is compressed and decompressed. Generally, the retainer spring cavity 42 may be twice the plug stem diameter 18a of the plug stem 18. The spring 24 is wrapped around the plug stem 18. The spring retainer 26 is comprised of a hold portion 50 and an insert portion 52 with the insert portion 52 having an insert portion-diameter 26a smaller than the middle opening 15c of the middle portion 14a of the pipe fitting 13. The hold portion 50 has an outer rim 54 that is used to maintain the hold portion 50 above the middle opening 15c. Looking again at FIG. 2B, the middle opening 15c has a middle edge 62, and now looking again at FIG. 6, the outer rim 54 of the hold portion 50 is adjacent to the middle edge 62 with the outer rim 54 sized to completely cover the plug top edge 54a as shown in FIG. 7.

Looking at FIG. 7, the retainer spring cavity 42 has a retainer inner base 64 that retains the spring 24 when the spring 24 is positioned between the spring pin 66 inserted in the plug stem 18 and the retainer inner base 64. The plug 28 comprise a plug first portion 29a and a plug seal portion 29b with the plug first portion 29a having an upper portion 74 that is cylindrical, the upper portion 74 has a connect-portion 76 having a nail stem 77a and nail head 77b. The nail stem 77a and the nail head 77b are generally cylindrical shaped with the nail stem 77a having a nail stem diameter 77aa ⅕ of the diameter of the plug diameter 28a and the nail head 77b being generally ⅓ of the plug diameter 28a and the nail stem 77a is as long as the nail head 77b is thick. The nail head 77b has a thickness equal to ¼ of the maximum thickness of the plug seal portion 29b. The plug seal portion 29b may be molded around the connect-portion 76 anchoring the plug first portion 29a to the plug seal portion 29b. The plug seal portion may be of a compressible material, such as rubber, polyethylene, and polyurethane. The spring retainer 26 and the upper portion 26a of the plug 28 may be made of any one of a plastic, such as polyethylene, a polymer, or a metal, such as copper or stainless steel. The plug first portion 29a has a plug retainer cavity 78 and a stem cavity 80 with the plug retainer cavity 78 sized for the insert portion 52 and the stem cavity 80 sized somewhat larger than the diameter of the plug stem 18 and having a depth of generally a ½ inch. The insert portion 52 is able to move out of the plug retainer cavity 78 when the spring 24 is compressed and a force on the knob 17 results in the plug stem 18 forcing the plug seal portion 29b against the base interior wall 31. The insert portion 52 moves back into the plug retainer cavity 78 when the force on the knob 17 is removed and the spring 24 is decompressed. Looking at FIGS. 4 and 7, the stem second end 36 is inserted through the cap aperture 40, through the spring 24, through the retainer spring cavity 42, through the retainer stem aperture 44, through the plug retainer cavity 78 and into the stem cavity 80 and secured by the stem fastening means 82. Looking at FIGS. 5A, 5B, and 6, when a force F is applied to the knob 17, the plug stem 18 advances compressing the spring 24 between the spring pin 66 and a retainer inner base 64 and pushes the plug seal portion 29b against the base interior wall 31 closing flow off between the first opening 15a and the second opening 15b. Removing the force F applied to the knob 17 decompresses the spring 24 removing the plug seal portion 29b from the base interior wall 31 opening flow between the first opening 15a and the second opening 15b.

The base interior wall 31 has a first slot 37a and a second slot 37b with each slot, such as the first slot 37a, sized to allow the plug first portion 29a and the plug seal portion 29b to advance into the base portion 14b so the that the plug seal portion 29b can seal against the base interior wall 31 closing flow from the first opening 15a to the second opening 15b. Looking at FIG. 2B, a middle inner rim 16c may be cut away to allow the plug 28 having a plug diameter 28d between the middle opening diameter 15cd and the middle inner rim diameter 16cd. The plug first portion 29a and the plug seal portion 29b may be inserted and advance along a middle portion interior wall 31b through the middle portion 14a.

The cap 22 is sized to fit over the middle opening 15c of the middle portion 14a of the pipe fitting 13. The plug first portion 29a has a plug diameter 28d somewhat smaller than the middle opening diameter 15cd as shown in FIG. 2B, and of a length somewhat longer that the interior diameter of the base portion 14b allowing the plug 28 to seal off the flow of a fluid when the plug 28 is in a closed state with the plug seal portion 29b adjacent to the base interior wall 31 of the base portion 14b of the pipe fitting 13 as shown in FIG. 3. The plug seal portion 29b has a transition portion 75a and a hemispherical cap portion 75b. Looking to FIG. 3, the hemispherical cap portion 75b has an outer radius of curvature equal to an inner radius of curvature R1 of the base portion 14b of interior wall 31. This is at the point where the center of the hemispherical cap portion 75b touches the base interior wall 31. The transition portion 75a has a transition thickness equal to a thickness of a connect length 76a of the connect-portion 76 of the plug first portion 29a shown in FIG. 7.

Figure 8A:
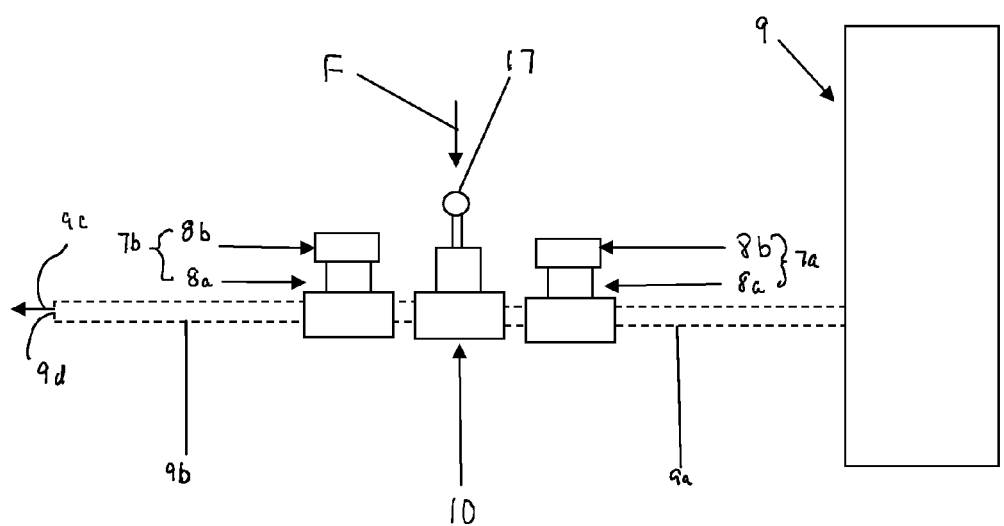
FIG. 8A shows the Flush Valve used with an HVAC system with the plug valve separated from the first cleanout and the second cleanout.
Figure 8B:
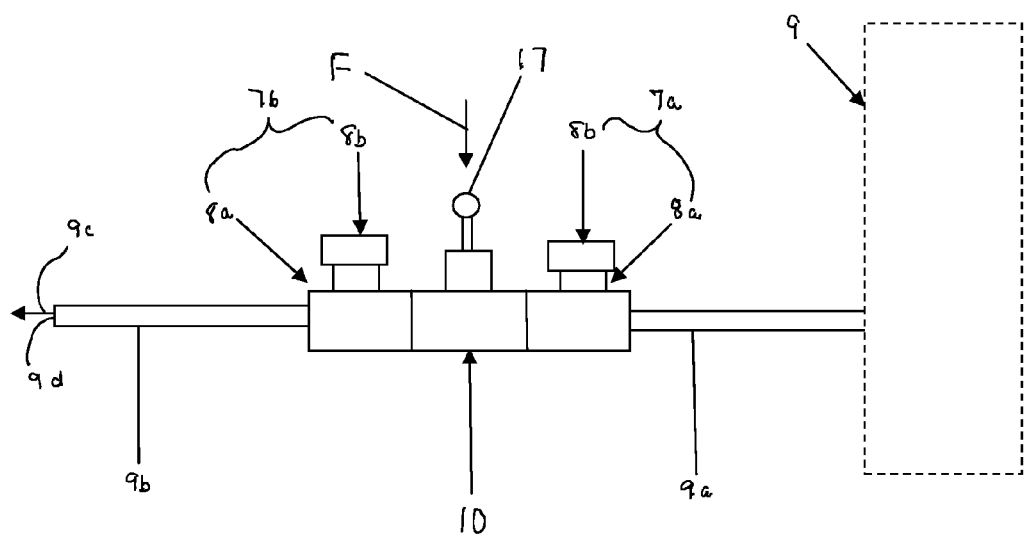
FIG. 8B shows the Flush Valve used with an HVAC system with the plug valve, the first cleanout and the second cleanout in a single unit
Figure 9A:
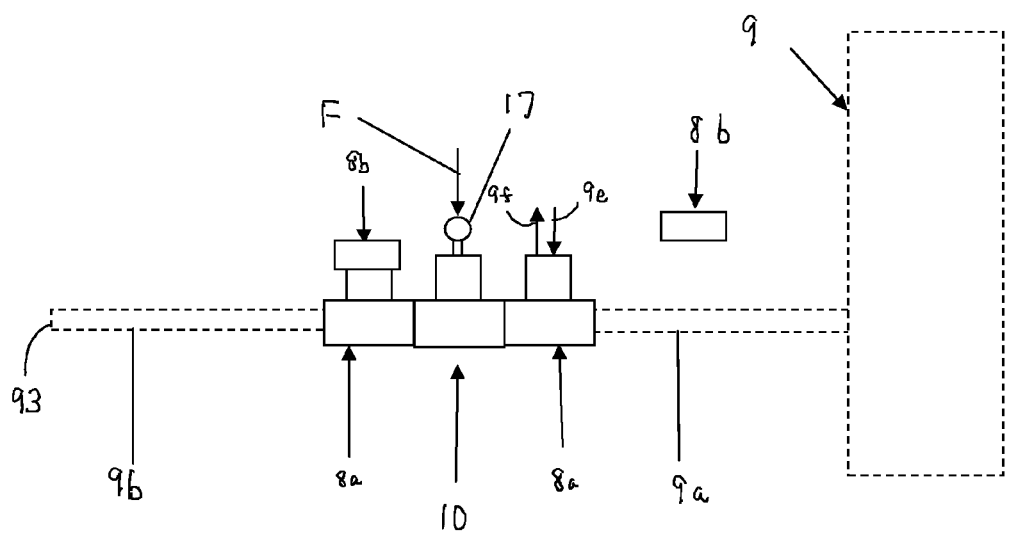
FIG. 9A shows the plug values used to flush a first line section
Figure 9B:
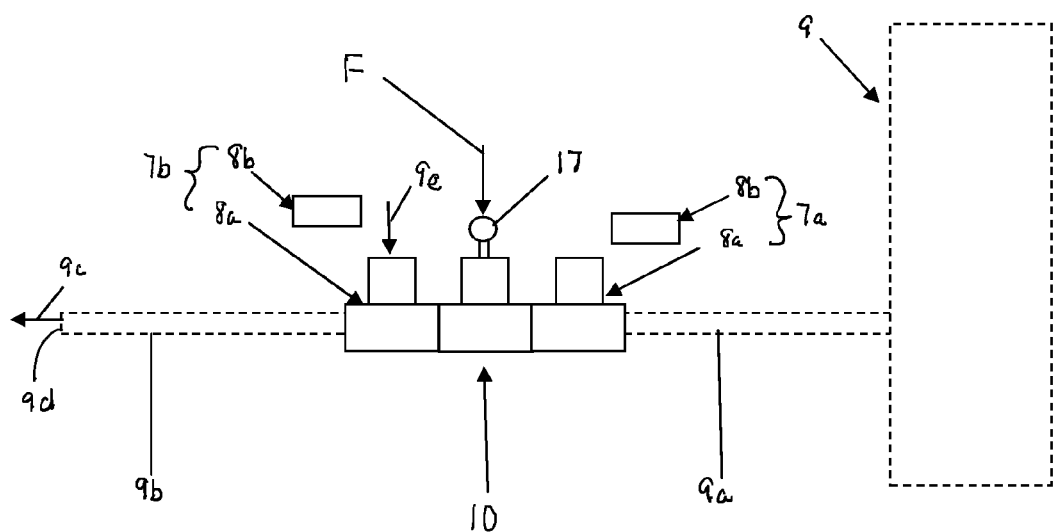
FIG. 9B shows the plug values used to flush a second line section

Looking again at FIGS. 1A and 8A, the plug valve 10 is particularly adaptable for uses in conjunction with an heating, ventilation, and air conditioning (HVAC) or HVAC system 9 having a flow 9c though a first section line 9a and a second section line 9b out of a line exist 9d where the plug valve 10 is integrated with a plurality of cleanout fittings, such as a first cleanout 7a and a second cleanout 7b. The plug valve 10, the first cleanout 7a, and the second cleanout 7b may be in single assembly as shown in FIG. 8B. The plug valve 10 can be used to clean out the first section line 9a and the second section line 9b attached to the HVAC system 9. For example, to dislodge any material in the first section line 9a, the force F is applied to knob 17 of the plug valve 10 to close off the flow 9c in the first section line 9a, and the cleanout cap 8b is removed from the first cleanout 7a and the second cleanout 7b, respectively. Looking at FIG. 9A, a pressure 9e or suction 9f may then be applied to the first cleanout 7a forcing any debris to dislodge in the first section line 9a. Looking at FIG. 9B, the second section line 9b of the system may be cleaned by removing the cleanout cap 8b and applying the pressure 9e to the second cleanout 7b forcing any material in the second section line 9b out of a line exit 9d. Once the first section line 9a and the second section line 9b are free of any debris, the cleanout caps 8b are reinstalled on the first cleanout 7a and the second cleanout 7b and the force F is then removed from the knob 17 allowing flow 9c to return through the first section line 9a and the second section line 9b and out of the line exit 9d as shown in FIG. 8A. The first cleanout 7a and the second cleanout 7b each may have a predetermined cleanout configuration that consists of a cleanout fitting 8a, such as the pipe fitting 13 shown in FIGS. 2B, 2C, and 2D, and a cap, such the cleanout cap 8b for the first cleanout 7a. The cleanout cap 8b is of the type commonly used to cap pipe fittings well known in the art.

Although the several versions of the present invention have been described in considerable detail with reference to the version thereof, other versions are possible. Therefore, the spirit and scope of the appended claims should not be limited to the description of the preferred version contained herein. Various deviations and modification may be made within the spirit and scope of this invention without departing from the main theme thereof.

What is claimed is:

1. A flush valve comprising a plug valve; said plug valve further comprising a plug assembly and a pipe fitting; said pipe fitting having a middle portion and a base portion, said base portion having a first opening and a second opening, said middle portion having a middle opening; said middle portion running from the middle opening to the base portion of the pipe fitting; said plug assembly inserted in the middle opening of said pipe fitting; the plug assembly further comprising a knob, a plug stem, a cap, a spring, a spring retainer, and a plug;

said knob having a knob cavity;

said plug stem having a stem first end and a stem second end;

said cap being sized to fit over the middle opening of the pipe fitting;

said cap having a cap aperture;

said cap aperture somewhat larger than the plug stem;

said spring retainer having a retainer spring cavity and a retainer stem aperture;

said retainer stem aperture somewhat larger that the plug stem;

said retainer spring cavity somewhat larger than twice a plug stem diameter of the plug stem;

said spring wrapped around the plug stem;

said spring retainer having a hold portion and an insert portion;

said hold portion having an outer rim;

said middle opening having a middle edge;

said outer rim sized to fit over the middle edge;

said outer rim holding the spring retainer in position at the middle opening;

said retainer spring cavity having a retainer inner base;

said plug stem having a spring pin;

said spring positioned between the spring pin and the retainer inner base;

said plug comprising a plug first portion and a plug seal portion;

said plug first portion having an upper portion and a connect-portion with a nail stem and nail head; said plug seal portion molded around the nail head of the connect-portion; said upper portion having an upper seal; said upper seal running circumferentially around the upper portion and positioned in an upper groove to prevent flow from leaking from around the upper portion out of the middle opening when the plug valve is closed;

said connect-portion anchoring the plug first portion to the plug seal portion;

said plug first portion having a plug retainer cavity and a stem cavity;

said plug retainer cavity sized for the insert portion;

said insert portion moving out of the plug retainer cavity when the spring is compressed and into the plug retainer cavity when the spring is decompressed;

said insert portion inserted in the plug retainer cavity so that the insert portion occupies the plug retainer cavity when the spring is decompressed;

said stem second end inserted through the cap aperture, through the retainer spring cavity, through the retainer stem aperture, through the plug retainer cavity and into the stem cavity and secured by a stem fastening means;

said stem first end inserted into the knob cavity, and anchored in the knob cavity by the stem fastening means;

said plug stem pushing the plug against a base interior wall when a force is applied to the knob compressing the spring between the spring pin and the retainer inner base; said plug closing the flow off between the first opening and the second opening when the spring is compressed so that the plug is adjacent to the base interior wall; said plug opening the flow between the first opening and the second opening when pressure is released on the knob decompressing the spring so that the plug is not adjacent to the base interior wall;

said middle portion having a middle inner rim;

said middle inner rim and said base interior wall configured to allow the plug assembly to be inserted so that the plug seal portion will prevent the flow between the first opening and the second opening when the plug seal portion is in contact with the base interior wall;

said cap sized to fit over the middle opening of the middle portion of the pipe fitting; said plug having a plug diameter between a middle opening diameter and a middle inner rim diameter of the pipe fitting; and said upper portion and a transition portion of the plug being long enough to allow the plug to seal when the plug is in contact the base interior wall of the base portion of the pipe fitting.

2. A flush valve comprising a first cleanout, a second cleanout, and a plug valve; and the plug valve located between the first cleanout and the second cleanout; the plug valve further comprises a plug assembly and a pipe fitting; said pipe fitting having a middle portion and a base portion, said base portion having a first opening and a second opening, said middle portion having a middle opening; said middle portion running from the middle opening to the base portion of the pipe fitting; the plug assembly comprises a plug stem, a spring, a spring retainer, and a plug;

said spring retainer having a hold portion and an insert portion;

said hold portion having an outer rim;

said middle opening having a middle edge;

said outer rim sized to fit over the middle edge;

said outer rim holding the spring retainer in position at the middle opening;

said spring retainer having a retainer spring cavity;

said retainer spring cavity having a retainer inner base;

said plug stem having a spring pin;

said spring positioned between the spring pin and the retainer inner base;

said plug comprising a plug first portion and a plug seal portion;

said plug first portion having an upper portion; said plug seal portion having a transition portion;

said upper portion having a upper seal; said upper seal running circumferentially around the upper portion and positioned in an upper groove to prevent a flow from leaking from around the upper portion out of the middle opening;

said plug first portion having a plug retainer cavity and a stem cavity;

said plug retainer cavity sized for the insert portion; said upper portion located between the plug seal portion and the hold portion of the spring retainer with the insert portion inserted in the plug retainer cavity;

said insert portion moving out of the plug retainer cavity when the spring is compressed moving the said plug seal portion into contact with a base interior wall of the pipe fitting closing off the flow between the first opening and the second opening of the pipe fitting;

and said insert portion moving into the plug retainer cavity when the spring is decompressed moving the plug seal portion away from the base interior wall and allowing the flow between the first opening and the second opening of the pipe fitting.

\* \* \* \* \*